United States Patent
Rudhardt et al.

(10) Patent No.: US 9,587,133 B2
(45) Date of Patent: Mar. 7, 2017

(54) DISPERSION COMPRISING CARBON NANOTUBES AND GRAPHENE PLATELETS

(75) Inventors: Daniel Rudhardt, Cologne (DE); Thomas Buesgen, Cologne (DE); Stefanie Eiden, Leverkusen (DE); Diana Dimowa Landen, Leverkusen (DE); Gesa Behnken, Cologne (DE)

(73) Assignee: FUTURECARBON GMBH, Bayreuth (DE)

( * ) Notice: Subject to any disclaimer, the term of this patent is extended or adjusted under 35 U.S.C. 154(b) by 364 days.

(21) Appl. No.: 14/239,331

(22) PCT Filed: Aug. 20, 2012

(86) PCT No.: PCT/EP2012/066195
§ 371 (c)(1),
(2), (4) Date: Feb. 18, 2014

(87) PCT Pub. No.: WO2013/026827
PCT Pub. Date: Feb. 28, 2013

(65) Prior Publication Data
US 2014/0212656 A1     Jul. 31, 2014

(30) Foreign Application Priority Data
Aug. 22, 2011 (EP) .................................. 11178301

(51) Int. Cl.
| | | |
|---|---|---|
| C09D 11/52 | (2014.01) | |
| B82Y 30/00 | (2011.01) | |
| B82Y 40/00 | (2011.01) | |
| H01B 1/24 | (2006.01) | |
| C01B 31/02 | (2006.01) | |
| C01B 31/04 | (2006.01) | |

(52) U.S. Cl.
CPC .............. *C09D 11/52* (2013.01); *B82Y 30/00* (2013.01); *B82Y 40/00* (2013.01); *C01B 31/0273* (2013.01); *C01B 31/0484* (2013.01); *H01B 1/24* (2013.01); *Y10T 428/25* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 2007/0158610 A1 | 7/2007 | Hong et al. | |
| 2007/0284557 A1 | 12/2007 | Gruner et al. | |
| 2009/0017211 A1 | 1/2009 | Gruner et al. | |
| 2010/0000441 A1 | 1/2010 | Jang et al. | |
| 2011/0024158 A1* | 2/2011 | Tsotsis | H01B 1/24 174/126.1 |
| 2012/0164433 A1* | 6/2012 | Advincula | B82Y 30/00 428/327 |
| 2012/0219702 A1* | 8/2012 | Scott | B82Y 10/00 427/79 |

FOREIGN PATENT DOCUMENTS

| | | |
|---|---|---|
| CN | 102005301 A | 4/2011 |
| CN | 102087885 A | 6/2011 |
| EP | 2 594 613 A2 | 5/2013 |
| JP | 2010-180263 A | 8/2010 |
| JP | 2013-006909 A | 1/2013 |
| JP | 2013-537570 A | 10/2013 |
| KR | 20090103985 A | 10/2009 |

OTHER PUBLICATIONS

International Search Report received in PCT/EP2012/066195 and dated Jan. 11, 2013.

* cited by examiner

*Primary Examiner* — Sheeba Ahmed
(74) *Attorney, Agent, or Firm* — McBee Moore Woodward Vanik

(57) ABSTRACT

A preferably aqueous dispersion comprises carbon nanotubes and graphene platelets, with the ratio by mass of carbon nanotubes to graphene platelets being situated within a range from ≥5:95 to ≤75:25. In a process for preparing a dispersion of this kind, carbon nanotubes and graphene platelets are combined so that the ratio by mass of carbon nanotubes to graphene platelets in the dispersion is in a range from ≥5:95 to ≤75:25. The dispersion can be used as a printing ink for producing electrically conductive films. The invention further provides an electrically conductive film comprising carbon nanotubes and graphene platelets, with the ratio by mass of carbon nanotubes to graphene platelets being situated within a range from ≥5:95 to ≤75:25.

19 Claims, No Drawings

DISPERSION COMPRISING CARBON NANOTUBES AND GRAPHENE PLATELETS

CROSS REFERENCE TO RELATED APPLICATIONS

This application is a §371 National Stage Application of PCT/EP2012/066195, filed Aug. 20, 2012, which claims priority to European Application No. 11178301.5, filed Aug. 22, 2011.

BACKGROUND OF THE INVENTION

Field of the Invention

The present invention relates to a dispersion comprising carbon nanotubes and graphene platelets and having a particular mass ratio of these components. It further relates to a process for producing such a dispersion, the use thereof as printing ink for producing electrically conductive films and an electrically conductive film based thereon.

Description of Related Art

Printed electronics are being increasingly used in a variety of applications such as portable electronics, signs, illumination, product identification, flexible electronics (which can, for example, be rolled or deformed), photovoltaics, medical apparatuses, antennas (in particular RFID antennas), displays, sensors, thin film batteries, electrodes and many others. Printed electronics have a variety of advantages over conventional electronics. Printing of conductive structures can be quicker than substractive processes (such as etching), produce less waste and involve a smaller amount of hazardous chemicals than in conventional processes. The resulting electronics can be used more simply in flexible applications such as flexible displays which can be rolled, twisted, bent or otherwise deformed.

Printed electronics are usually made by printing the conductor tracks or other constituents of the electric circuits onto a substrate using an electrically conductive, metallic ink. The inks usually contain silver particles and occasionally copper particles, other metal particles and/or conductive polymers. However, conductive polymers alone are generally not sufficiently electrically conductive. In addition, the resulting printed metallic circuits are only inadequately electrically conductive in flexible applications in which they are regularly mechanically deformed by bending and/or stretching.

The printed substrates frequently have to be subsequently sintered at elevated temperatures in order to join the conductive metal particles to one another so as to achieve the desired electrical conductivity. The temperatures required for the sintering processes often restrict the choice of substrates for producing the electronics. While inexpensive materials such as paper, polyolefins (for example polypropylene) and the like would be desirable as substrates for printed electronics in numerous applications, the sintering temperatures often required are too high for such materials to be able to be used. In addition, silver is expensive, while base metals can form oxides on exposure to air and these make the material insufficiently conductive for the respective use.

In addition, the use of metal-based inks can contribute to an increased weight of the resulting component and due to the abovementioned sintering process can add one or more additional steps, time and complexity to the production process. It would therefore be desirable to achieve printed electronic components using inks which do not contain expensive noble metals.

In the light of this background, US 2007/0284557 A1 and US 2009/0017211 A1 disclose a transparent and conductive film which comprises a network of graphene platelets. The film can also contain an intermeshing network of other nanostructures, a polymer and/or a functionalizing agent. This patent application further describes a process for producing such a film, for example by provision of the graphene platelets in a solution and removal of the solvent. These patent applications also disclose, in an example, graphene-CNT composites as constituents of the film, but without giving more detailed information regarding the relative proportions of graphene and CNT.

US 2007/0158610 A1 relates to a process for producing a stable suspension of carbon nanoparticles in a hydrophilic heat transfer liquid in order to improve the thermal conductivities and other properties such as the freezing point of an antifreeze. The process comprises the step of dispersing carbon nanoparticles directly in a mixture of a heat transfer liquid and other additives in the presence of surfactants under the temporary action of ultrasound.

US 2010/0000441 A1 is concerned with a conductive ink which is based on graphene platelets and comprises (a) graphene nanoplatelets (preferably unoxidized or original graphene) and (b) a liquid medium in which the graphene nanoplatelets are dispersed, where the graphene nanoplatelets take up at least 0.001% by volume, based on the total volume of the ink. The ink can also contain a binder or matrix material and/or a surfactant. Furthermore, the ink can contain other fillers such as carbon nanotubes, carbon nanofibers, metal nanoparticles, carbon black, conductive organic compounds, etc. The graphene platelets preferably have an average thickness of not more than 10 nm and preferably of not more than 1 nm. Inks mentioned can be printed in order to form electrically or thermally conductive components. An example mentions an ink containing 5% of carbon nanotubes and 1% of graphene nanoplatelets.

SUMMARY

It is an object of the present invention to achieve a further improvement in the conductive inks which are free of metal particles known from the prior art. In particular, the electrical conductivities of the films obtained therewith should be increased.

This object is achieved according to the invention by a dispersion comprising carbon nanotubes and graphene platelets, wherein the mass ratio of carbon nanotubes to graphene platelets is in the range from ≥5:95 to ≤75:25.

DETAILED DESCRIPTION OF A PREFERRED EMBODIMENT

It has surprisingly been found that dried films of the dispersions of the invention utilized as ink display a synergistic effect of the electrical conductivity. The specific conductivity is a number of times as high as in the case of films formed exclusively with carbon nanotubes or graphene platelets.

Without being tied to a theory, it is assumed that carbon nanotubes are generally present in slightly bent form and tend to form networks rather than closest packing. Although graphenes tend to assume an ordered arrangement because of their platelet structure, there is little contact between the platelets. The ratios according to the invention of carbon nanotubes to graphene platelets compensate for these disadvantages and result in an increase in the electrical conductivity. As described in more detail later, a maximum of the specific conductivity in dried films of the dispersions of the invention is attained at a particular mass ratio of carbon nanotubes to graphene platelets.

Carbon nanotubes (CNTs) are, for the purposes of the invention, all single-walled or multiwalled carbon nanotubes of the cylinder type (for example in the patent Iijima U.S. Pat. No. 5,747,161; Tennant WO 86/03455), scroll type, multiscroll type, cup-stack type consisting of conical cups which are closed at one end or open at both ends (for example in the patent Geus EP198,558 and Endo U.S. Pat. No. 7,018,601B2), or with an onion-like structure. Preference is given to using multiwalled carbon nanotubes of the cylinder type, scroll type, multiscroll type and cup-stack type or mixtures thereof. It is advantageous for the carbon nanotubes to have a ratio of length to external diameter of ≥5, preferably ≥100.

In contrast to the abovementioned known carbon nanotubes of the scroll type having only one continuous or interrupted graphene layer, there are also carbon nanotube structures which consist of a plurality of graphene layers which are assembled to form a stack and are rolled up. These are referred to as the multiscroll type. These carbon nanotubes are described in DE 10 2007 044031 A1, which is fully incorporated by reference. This structure behaves relative to the carbon nanotubes of the simple scroll type in a manner comparable to the structure of multiwalled cylindrical carbon nanotubes (cylindrical MWNT) relative to the structure of the single-walled cylindrical carbon nanotubes (cylindrical SWNT).

Graphene is the term for a modification of carbon having a two-dimensional structure in which each carbon atom is surrounded by three further carbon atoms so as to form a honeycomb-like pattern. In this respect, graphene may be regarded as a single graphite layer. However, in the context of the present invention, the term "graphene" also includes thin stacks of single graphite layers which owing to their small thickness have physical properties which differ substantially from those of graphite bulk material. Further names for such multilayer graphenes are, inter alia, graphite (nano)platelets, nanoscale graphites and expanded graphite platelets. There are various approaches to the production of graphene, for example mechanical or chemical exfoliation of graphite or epitactic growth on silicon carbide or on transition metals.

The graphene platelets used can, for example, have a thickness of ≤100 nm, preferably ≤10 nm and more preferably ≤1 nm. Each graphene platelet has a length and a width parallel to the graphite plane and a thickness perpendicular to the graphite plane. The largest dimension is here referred to as the length, the smallest dimension as the thickness and the last dimension as the width. The length and the width of the graphene platelets can, for example, be in the range from ≥1 μm to ≤20 μm.

For the purposes of the present invention, it is possible to use both unfunctionalized and functionalized carbon nanotubes and/or graphene platelets, for example carbon nanotubes and/or graphene platelets comprising carboxyl groups, sulfonic acid groups, amino groups, thiol groups and/or vinyl groups. Preference is given to unfunctionalized carbon nanotubes and graphene platelets.

All liquids are in principle suitable as dispersion medium, with preference being given to polar liquids because of the advantageous dispersibility of the carbon nanotubes and graphene platelets.

Preferred embodiments and further aspects of the present invention are indicated below. They can be combined with one another in any way as long as the contrary is not indicated by the context.

In an embodiment of the dispersion, the mass ratio of carbon nanotubes to graphene platelets is in the range from ≥20:80 to ≤60:40. Further preference is given to such a mass ratio in the range from ≥30:70 to ≤50:50.

In a further embodiment, the dispersion is an aqueous dispersion. Thus, the water content of the dispersion can, for example, be in the range from ≥50% by weight to ≤99.5% by weight and preferably from ≥80% by weight to ≤99% by weight, based on the total weight of the dispersion. It is possible to add ethylene glycol or another glycol as additive to the aqueous dispersion. This is particularly advantageous in use for ink-jet printing inks. Suitable proportions by weight of the glycol are, for example, in the range from ≥1% by weight to ≤15% by weight, based on the total weight of the dispersion.

In a further embodiment of the dispersion, the carbon nanotubes are single-walled or multiwalled carbon nanotubes having an average external diameter of from ≥3 nm to ≤100 nm, preferably from ≥5 nm to ≤25 nm, and a ratio of length to diameter of ≥5, preferably ≥100. The high aspect ratio in particular is advantageous in the case of such carbon nanotubes. The individual CNTs being present in more highly aggregated or agglomerated form is not ruled out.

In a further embodiment of the dispersion, the carbon nanotubes are present in nonaggregated form and have an average particle size, expressed as the $d_{90}$, of from ≥0.5 μm to ≤2 μm.

The $d_{90}$ of the average particle size can be determined by means of laser light scattering (an example of an instrument is the Mastersizer MS 2000 with dispersion unit Hydro S from Malvern; in water). This value is preferably from ≥0.75 μm to ≤1.75 μm and more preferably from ≥1 μm to ≤1.5 μm. An advantage of such small particle sizes is that the printing head in the case of ink-jet printing processes and the screen in the case of screen printing processes do not become blocked.

The abovementioned particle sizes can be obtained from commercially available CNT agglomerates by means of, for example, milling, a jet disperser, a high-pressure homogenizer or by means of ultrasound.

In a further embodiment of the dispersion, the graphene platelets are from one-layer to one hundred-layer graphene platelets. The number of graphene layers is preferably from ≥10 to ≤90, more preferably from ≥20 to ≤60. The number of graphene layers can be derived from the specific surface area of the graphenes.

In a further embodiment of the dispersion, the total content of carbon nanotubes and graphene platelets is from ≥1% by weight to ≤15% by weight. In the case of higher proportions, the dispersibility could under some circumstances no longer be ensured and nozzles of ink-jet printing heads could become blocked. The content is preferably from ≥1.5% by weight to ≤8% by weight, more preferably from ≥3% by weight to ≤6% by weight.

In a further embodiment of the dispersion, it further comprises additives selected from the group consisting of alkoxylates, alkylol amides, esters, amine oxides, alkyl polyglucosides, alkylphenols, arylalkylphenols, water-soluble homopolymers, water-soluble random copolymers, water-soluble block copolymers, water-soluble graft polymers, polyvinyl alcohols, copolymers of polyvinyl alcohols and polyvinyl acetates, polyvinylpyrrolidones, cellulose, starch, gelatin, gelatin derivatives, amino acid polymers, polylysine, polyaspartic acid, polyacrylates, polyethylenesulfonates, polystyrenesulfonates, polymethacrylates, condensation products of aromatic sulfonic acids with formaldehyde, naphthalenesulfonates, lignosulfonates, copolymers of acrylic monomers, polyethylenimines, polyvinylamines, polyallylamines, poly(2-vinylpyridines), block copolyethers, block copolyethers having polystyrene blocks and/or polydiallyldimethylammonium chloride.

The additive (dispersant) is particularly preferably selected from among polyvinylpyrrolidone, block copolyethers and block copolyethers having polystyrene blocks. Very particular preference is given to polyvinylpyrrolidone having a molar mass of about 10 000 g/mol (for example PVP K15 from Fluka) and polyvinylpyrrolidone having a molar mass of about 360 000 g/mol (for example PVP K90 from Fluka) and also sodium lignosulfonate (LSSNa).

In a further embodiment of the dispersion, it has a viscosity at 25° C. of from ≥2 mPa s to ≤100 000 mPa s at a shear rate of 1/s. The viscosities can be determined as follows: about 3 ml of the dispersion are placed in the sample holder of an Anton Paar MCR 301 rotational viscometer equipped with a double-slit geometry (DG 67) for low-viscosity media. The flow curves are recorded in the range from 0.25 to 200 $s^{-1}$. The measurements are carried out at 25° C.

A preferred range for the viscosity of the dispersion is from ≥5 mPa s to ≤20 mPa s at a shear rate of 1/s. This range is particularly suitable for ink-jet printing inks. A further preferred range for the viscosity of the dispersion is from ≥50 mPa s to ≤150 mPa s at a shear rate of 1/s. This range is particularly suitable for inks for gravure and flexographic printing. A further preferred range for the viscosity of the dispersion is ≥1000 mPa s to ≤100 000 mPa s at a shear rate of 1/s. This range is particularly suitable for inks for screen printing.

The present invention further provides a process for producing a dispersion according to the invention, which comprises the step of combining carbon nanotubes and graphene platelets in such a way that the mass ratio of carbon nanotubes to graphene platelets in the dispersion is in the range from ≥5:95 to ≤75:25.

Of course, the mass ratios can also be in the abovementioned ranges of from ≥20:80 to ≤60:40 or ≥30:70 to ≤50:50 and the dispersion and the components thereof can have the properties indicated in connection with the dispersion. The carbon nanotubes and the graphene platelets are advantageously dispersed separately or together in an aqueous medium and the dispersions obtained are subsequently combined. The dispersing step can be carried out with the aid of ultrasound and/or jet dispersers.

The invention further provides for the use of a dispersion according to the invention as printing ink for producing electrically conductive films. The terms "electrically conductive film" for the present purposes encompasses conductor tracks and electric circuits. The dispersion of the invention can advantageously be used for producing flexible, electrically conductive films or structures which can retain their conductivity on deformation or bending of the substrate and at the same time can display good adhesion to a substrate, for example to polycarbonate.

Solvents, film formers and further additives can be added to the formulations for the printing ink. Particular preference is given to using a solvent selected from the group consisting of $C_1$-$C_5$-alcohols, in particular $C_1$-$C_3$-alcohols, ethers (in particular dioxolane), ketones and/or glycols (in particular diethylene glycol).

The film former is preferably selected from the group consisting of polydimethylsiloxane, polyacrylate, ammonium salts of polyacrylates, siloxanes, wax combinations, copolymers having pigment-active groups, low molecular weight polymers, hydroxyethylcellulose and/or polyvinyl alcohol and/or from the group of the additives which act as dispersants mentioned above in connection with a further embodiment of the dispersion. Here, particular preference is given to the dispersant BYK 356 from BYK-Chemie, Wesel (a polyacrylate) and BYK 154 from the same company (the ammonium salt of an acrylate copolymer).

The further additives are preferably selected from the group consisting of pigments, antifoams, light stabilizers, optical brighteners, corrosion inhibitors, antioxidants, algaecides, plasticizers, thickeners and/or surface-active substances. Very particular preference is given to using Pluronic PE10400 (from BASF, Ludwigshafen), a triblock copolymer of $C_3$-polyether, $C_2$-polyether, $C_3$-polyether units having about 40% by weight of $C_2$-polyether, as additive.

The use of the dispersion of the invention in flexographic printing is conceivable according to the invention. The printing ink can also be used in an ink-jet printing process. Suitable ink-jet printing processes encompass, for example, thermal ink-jet printing, piezoelectric ink-jet printing or continuous and drop-on-demand ink-jet printing (continuous ink-jet printing, DOD ink-jet printing) and aerosol printers. In ink-jet printing, droplet formation is preferably achieved in a piezoelectrically driven printing head. Here, a sound wave is generated in the ink volume of the printing nozzle by means of the piezoelectric effect via the walls of the ink nozzle and this causes ejection of an ink droplet at the opening of the nozzle in the direction of the printing substrate. In respect of the thermal stability of the functional inks, the advantage of the piezoelectric heads is the comparatively mild handling of the inks.

Another aspect of the present invention is an electrically conductive film comprising carbon nanotubes and graphene platelets, wherein the mass ratio of carbon nanotubes to graphene platelets is in the range from ≥5:95 to ≤75:25. The film can be obtained by printing of a substrate with the dispersion or printing ink according to the invention, followed by removal (preferably evaporation) of the dispersion liquid. Of course, the mass ratios can also be in the abovementioned ranges of from ≥20:80 to ≤60:40 or from ≥30:70 to ≤50:50 and the dispersion and the components thereof can have the properties indicated in connection with the dispersion.

In an embodiment of the film, it has a specific conductivity of ≥7 kS/m. Preferred conductivities are in the range from ≥7 kS/m to ≤50 kS/m and more preferably from ≥15 kS/m to ≤30 kS/m. The conductivity can be determined as follows: films obtained are contacted with 2 thin, in each case 1 cm long strips of conductive silver paint at a spacing of 1 cm (so as to form approximately a square). The conductive paint is subsequently dried (60° C. for at least 15 minutes). The layer resistances are measured by contacting of the two conductive paint strips with a multimeter (for example Keithley 2100). The thickness of the layers is determined by means of a profilometer (for example from Dektak).

In a further embodiment of the film, it is present as electrical conductor track on a substrate. Such conductor tracks can also be used in the form or as constituent of, for example, antenna elements (as for RFID devices), sensor elements, light-emitting diodes, photovoltaic cells, touch panels or thin-film transistors (TFTs).

The present invention is illustrated in more detail by the following examples, without being restricted thereto.

Materials:

Sodium lignosulfonate (LSSNa) 12 kDa: CAS No. 68512-34-5.

Graphene: Graphenes X-GR0710 from Geo-Tech Polymers (Cielo Holdings). These graphenes have a specific surface area of on average 48 m$^2$/g and, derived therefrom, an average of 54 layers. The d$_{90}$ of jet-dispersed samples is about 8 µm.

Production of the Graphene Dispersion:

0.46 g of LSSNa 12 kDa were admixed with 28.05 g of water and dissolved with stirring in a 100 ml glass flask. 0.56 g of graphene was subsequently weighed into a further glass flask. The graphenes were dispersed into the aqueous polymer solution in 4 portions under the action of ultrasound for 4×3 min (1 min on, 20 s pause) at 40% amplitude while cooling in ice. Toward the end, the total dispersion was once more subjected to ultrasound at an amplitude of 40% for 15 min (1 min on, 20 s pause).

Production of the CNT Dispersion:

5 g of CNTs were mixed with 4 g of LSSNa in 100 ml of water and treated by means of a jet disperser for 10×1000 bar. The d$_{90}$ of the CNTs treated in this way was 1.25 µm. The 5% CNT dispersion was diluted with water to a 2% by weight dispersion.

Production of the Mixtures:

The graphene dispersion was mixed with the CNT dispersion in various ratios by means of a magnetic stirrer and the specific conductivity was subsequently determined. As a result of the method of preparation, the total content of graphene and CNTs was always 2% by weight, even when the relative proportions of graphene and CNT were varied.

Determination of the Electrical Conductivity:

The paste of CNT and graphenes was applied between two strips of adhesive tape stuck onto the substrate at a spacing of 2 mm and dried at 50° C. The resistance was subsequently measured at a spacing of 10 mm on the line, the thickness of the line was determined and the specific conductivity was calculated from the data.

The following results were obtained:

| Mass ratio of CNT:graphene | Specific conductivity [kS/m] | Standard deviation [S/m] |
| --- | --- | --- |
| Exclusively graphenes (comparative example) | 5.870 | 475 |
| 5:95 | 9.734 | 526 |
| 10:90 | 11.854 | 229 |
| 20:80 | 14.569 | 1104 |
| 30:70 | 21.716 | 1382 |
| 50:50 | 12.929 | 2164 |
| 75:25 | 11.308 | 2330 |
| Exclusively CNTs (comparative example) | 2.205 | 403 |

All mixtures according to the invention had, after drying, a higher specific conductivity than the pure components CNT and graphene, respectively. A distinct maximum in the specific conductivity is observed at a mass ratio of CNT:graphene of about 30:70, which at about 22 kS/m is about four times as high as the conductivity for pure graphene and about ten times as high as that for pure CNT.

The invention claimed is:

1. A dispersion comprising carbon nanotubes and graphene platelets, wherein the mass ratio of carbon nanotubes to graphene platelets is in a range from ≥5:95 to ≤75:25.

2. The dispersion as claimed in claim 1, wherein the mass ratio of carbon nanotubes to graphene platelets is in the range from ≥20:80 to ≤60:40.

3. The dispersion as claimed in claim 1, wherein the dispersion is an aqueous dispersion.

4. The dispersion as claimed in claim 1, wherein the carbon nanotubes are single-walled and/or multiwalled carbon nanotubes having an average external diameter of from ≥3 nm to ≤100 nm and a ratio of length to diameter of ≥5.

5. The dispersion as claimed in claim 1, wherein the carbon nanotubes are present in nonaggregated form and have an average particle size, expressed as the d$_{90}$, of from ≥0.5 µm to ≤2 µm.

6. The dispersion as claimed in claim 1, wherein the graphene platelets are from one-layer to one hundred-layer graphene platelets.

7. The dispersion as claimed in claim 1, wherein the total content of carbon nanotubes and graphene platelets is from ≥1% by weight to ≤15% by weight.

8. The dispersion as claimed in claim 1 which further comprises one or more additives selected from the group consisting of alkoxylates, alkylol amides, esters, amine oxides, alkyl polyglucosides, alkylphenols, arylalkylphenols, water-soluble homopolymers, water-soluble random copolymers, water-soluble block copolymers, water-soluble graft polymers, polyvinyl alcohols, copolymers of polyvinyl alcohols and polyvinyl acetates, polyvinylpyrrolidones, cellulose, starch, gelatin, gelatin derivatives, amino acid polymers, polylysine, polyaspartic acid, polyacrylates, polyethylenesulfonates, polystyrenesulfonates, polymethacrylates, condensation products of aromatic sulfonic acids with formaldehyde, naphthalenesulfonates, lignosulfonates, copolymers of acrylic monomers, polyethylenimines, polyvinylamines, polyallylamines, poly(2-vinylpyridines), block copolyethers, block copolyethers having polystyrene blocks and/or polydiallyldimethylammonium chloride.

9. The dispersion as claimed in claim 1 having a viscosity at 25° C. of from ≥2 mPa s to ≤100 000 mPa s at a shear rate of 1/s.

10. A process for producing a dispersion as claimed in claim 1, which comprises combining carbon nanotubes and graphene platelets in such a way that the mass ratio of carbon nanotubes to graphene platelets in the dispersion is in a range from ≥5:95 to ≤75:25.

11. A dispersion as claimed in claim 1 capable of being used as printing ink for producing electrically conductive film.

12. An electrically conductive film comprising carbon nanotubes and graphene platelets, wherein the mass ratio of carbon nanotubes to graphene platelets is in a range from ≥5:95 to ≤75:25.

13. The film as claimed in claim 12 having a specific conductivity of ≥7 kS/m.

14. The film as claimed in claim 12 present as electrical conductor track on a substrate.

15. The dispersion as claimed in claim 1, wherein the mass ratio of carbon nanotubes to graphene platelets is in the range from ≥30:70 to ≤50:50.

16. The dispersion as claimed in claim 1, wherein the total content of carbon nanotubes and graphene platelets is from ≥1.5% by weight to ≤8% by weight.

17. The dispersion as claimed in claim 1, wherein the total content of carbon nanotubes and graphene platelets is from ≥3% by weight to ≤6% by weight.

18. The dispersion as claimed in claim 1 which further comprises a lignosulfonate.

19. A printing ink comprising the dispersion as claimed in claim 1.

* * * * *